United States Patent
Harwood et al.

(10) Patent No.: US 8,306,193 B2
(45) Date of Patent: Nov. 6, 2012

(54) METHOD OF PAIRING A PORTABLE DEVICE WITH A COMMUNICATIONS MODULE OF A VEHICULAR, HANDS-FREE TELEPHONE SYSTEM

(75) Inventors: Jody K. Harwood, Canton, MI (US); Jason G. Bauman, Huntington Woods, MI (US); Kenan Robert Rudnick, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 236 days.

(21) Appl. No.: 12/837,604

(22) Filed: Jul. 16, 2010

(65) Prior Publication Data
US 2010/0279612 A1    Nov. 4, 2010

Related U.S. Application Data

(62) Division of application No. 10/745,072, filed on Dec. 22, 2003, now Pat. No. 7,801,283.

(51) Int. Cl.
*H04M 1/64* (2006.01)
*H04B 1/18* (2006.01)

(52) U.S. Cl. .................... 379/88.03; 455/151.2
(58) Field of Classification Search .... 379/88.01–88.19; 455/151.2
See application file for complete search history.

(56) References Cited

U.S. PATENT DOCUMENTS

| | | |
|---|---|---|
| 4,961,212 A | 10/1990 | Marui et al. |
| 5,353,376 A | 10/1994 | Oh et al. |
| 5,805,672 A | 9/1998 | Barkat et al. |
| 5,864,603 A | 1/1999 | Haaviato et al. |
| 5,898,392 A | 4/1999 | Bambini et al. |
| 6,041,300 A | 3/2000 | Ittycheriah et al. |
| 6,131,044 A | 10/2000 | Ryu |
| 6,167,251 A | 12/2000 | Segal et al. |
| 6,212,408 B1 | 4/2001 | Son et al. |
| 6,240,303 B1 | 5/2001 | Katzur |
| 6,366,649 B1 | 4/2002 | Chun et al. |
| 6,377,825 B1 | 4/2002 | Kennedy et al. |
| 6,449,496 B1 | 9/2002 | Beith et al. |
| 6,505,159 B1 | 1/2003 | Theodore |
| 6,603,977 B1 | 8/2003 | Walsh et al. |
| 6,748,244 B2 | 6/2004 | Odinak |
| 7,117,021 B2 | 10/2006 | Shearer et al. |

(Continued)

FOREIGN PATENT DOCUMENTS
JP    2003198713 A    7/2003

*Primary Examiner* — Fan Tsang
*Assistant Examiner* — Solomon Bezuayehu
(74) *Attorney, Agent, or Firm* — Brooks Kushman P.C.

(57) ABSTRACT

A method of pairing Bluetooth™ enabled devices including a portable phone with a Bluetooth™ communications module of a vehicular, hands-free telephone system includes using vocal communications to prompt an operator of the phone to enter a given PIN number into the phone. The presence of any Bluetooth™ enabled devices within the vicinity of the communications module is searched. Vocal communications are used to prompt the operator to vocally state a name for the phone and to vocally state a pairing priority to be assigned to the phone. If the assigned pairing priority is not assigned to another Bluetooth™ enabled device, then the name and the pairing priority are associated with the phone. Communications between the communications module and the phone are then enabled if the phone has the highest pairing priority amongst all of the Bluetooth™ enabled devices present within the vicinity of the communications module.

6 Claims, 4 Drawing Sheets

U.S. PATENT DOCUMENTS

| | | |
|---|---|---|
| 7,286,857 B1 | 10/2007 | Walker et al. |
| 7,327,226 B2 | 2/2008 | Turnbull et al. |
| 7,519,085 B2 | 4/2009 | Stolyarov et al. |
| 7,620,549 B2 | 11/2009 | Di Cristo et al. |
| 2001/0000505 A1 | 4/2001 | Segal et al. |
| 2002/0025042 A1* | 2/2002 | Saito ............................ 380/258 |
| 2002/0032042 A1 | 3/2002 | Poplawsky et al. |
| 2002/0090912 A1* | 7/2002 | Cannon et al. .................. 455/41 |
| 2002/0137505 A1 | 9/2002 | Eiche et al. |
| 2002/0173347 A1* | 11/2002 | Kinnunen .................... 455/569 |
| 2002/0177472 A1* | 11/2002 | Tomoda et al. .............. 455/569 |
| 2003/0032460 A1 | 2/2003 | Cannon et al. |
| 2003/0040903 A1 | 2/2003 | Gerson |
| 2003/0048890 A1* | 3/2003 | Weiss et al. ............. 379/201.02 |
| 2003/0051083 A1* | 3/2003 | Striemer ........................ 710/72 |
| 2003/0064755 A1 | 4/2003 | Piwowarski |
| 2003/0065918 A1* | 4/2003 | Willey .......................... 713/168 |
| 2003/0083113 A1 | 5/2003 | Chua et al. |
| 2003/0101052 A1 | 5/2003 | Chen et al. |
| 2003/0114202 A1* | 6/2003 | Suh et al. ..................... 455/569 |
| 2003/0135371 A1 | 7/2003 | Chang et al. |
| 2003/0220765 A1* | 11/2003 | Overy et al. .................. 702/158 |
| 2005/0004838 A1* | 1/2005 | Perkowski et al. ............. 705/14 |
| 2005/0014534 A1* | 1/2005 | Hareng et al. ................ 455/567 |
| 2005/0021940 A1* | 1/2005 | Ma ................................ 713/155 |
| 2005/0076242 A1* | 4/2005 | Breuer ......................... 713/201 |
| 2005/0125664 A1* | 6/2005 | Berkema et al. ............. 713/168 |
| 2005/0216151 A1 | 9/2005 | Gawlik et al. |
| 2005/0232187 A1* | 10/2005 | Haller et al. ................. 370/328 |
| 2006/0064458 A1* | 3/2006 | Gehrmann .................... 709/203 |
| 2006/0190162 A1 | 8/2006 | Ampunan et al. |
| 2007/0033287 A1* | 2/2007 | Kiyose et al. ................. 709/229 |
| 2007/0082732 A1* | 4/2007 | Krummel et al. .............. 463/29 |
| 2007/0142028 A1 | 6/2007 | Ayoub et al. |
| 2007/0219786 A1 | 9/2007 | Isaac et al. |
| 2008/0248797 A1 | 10/2008 | Freeman et al. |
| 2012/0045993 A1* | 2/2012 | Page et al. .................... 455/41.2 |

* cited by examiner

METHOD OF PAIRING A PORTABLE DEVICE WITH A COMMUNICATIONS MODULE OF A VEHICULAR, HANDS-FREE TELEPHONE SYSTEM

CROSS-REFERENCE TO RELATED APPLICATIONS

This is a divisional application of U.S. application Ser. No. 10/745,072, filed Dec. 22, 2003, now U.S. Pat. No. 7,801,283, which is hereby incorporated by reference in its entirety.

BACKGROUND OF THE INVENTION

1. Field of the Invention

The present invention relates generally to a vehicular, hands-free telephone system. More particularly, the present invention relates to a method of operating a hands-free, Bluetooth™ enabled telephone system for a vehicle.

2. Background Art

A conventional hands-free telephone system for a vehicle enables an operator of the vehicle such as the driver to talk on a telephone such as a cell phone while using both hands for driving the vehicle during a call. Typically, the driver manually uses keys on the cell phone to access functions, other than when answering a phone call, making a phone call, or re-dialing a recently dialed number. Conventional hands-free telephone systems employ a voice recognition module which enables the driver to answer and make phone calls and re-dial numbers using voice commands. As such, the advantages of conventional hands-free telephone systems for vehicles are added convenience and safety.

Certain vehicular, hands-free telephone systems employ Bluetooth™ communications technology. Such systems include a vehicle appliance which is typically configured as part of the operating panel of the vehicle. The vehicle appliance includes a Bluetooth™ communications module for wirelessly communicating with a Bluetooth™ enabled cell phone located somewhere in the vehicle. The vehicle appliance further includes a voice recognition module and other input interfaces such as keypads and buttons for receiving voice commands and other input commands from the driver regarding the use of the cell phone. The vehicle appliance is further connected to the vehicle electrical bus architecture in order to output verbal and display information through the vehicle's radio speakers and display screens.

A problem with the way in which a conventional hands-free telephone system enables the driver to control the telephone system using voice commands is that the driver may only issue one voice command at a time. For example, to dial a telephone number, a conventional hands-free telephone system is configured such that the driver says the voice command "dial." The telephone system then goes into a dialing mode and verbally outputs something to the effect of "name or number please." The driver then says a second voice command which may contain the number such as "818 555-1212." The telephone system then causes the cell phone to dial that telephone number to make the call.

Alternatively, the driver may say a second voice command containing the name such as "John." If the cell phone has one stored telephone number for "John", then the telephone system causes the cell phone to dial John's telephone number to make the call. If the cell phone has more than one stored telephone number for "John" such as work and home telephone numbers, then the telephone system verbally outputs something to the effect of "work or home." The driver then says a third voice command such as "home." The telephone system then causes the cell phone to dial John's home telephone number to make the call.

As such, the telephone system is configured such that the driver can only state one voice command at a time. It would be desirable if the telephone system were configured such that the driver could state two or more voice commands at a time. For example, it would be desirable if the driver could say the two voice commands "Dial John" at once without interruption by the telephone system and then have the telephone system cause the cell phone to dial the stored telephone number for John to make the call. Likewise, it would be desirable if the driver could say the three voice commands "Dial John at home" at once and then have the telephone system to cause the cell phone to dial John's home telephone number to make the call. It would be further desirable if the ability for the driver to issue multiple voice commands at once is also available when accessing other cell phone functions such as pairing the cell phone with the Bluetooth™ communications module.

In order to use cell phones with a Bluetooth™ enabled hands-free telephone system, the cell phones need to be associated with the Bluetooth™ communications module through a process called "pairing." The pairing process entails the driver issuing voice commands in response to verbal interrogatories from the telephone system in order to pair cell phones and other Bluetooth™ enabled devices with the Bluetooth™ communications module. The typical pairing process is confusing to the driver. It would be desirable if the pairing process was conducted in a driver friendly manner.

Bluetooth™ enabled hands-free telephone systems are configured to enable the driver to say a voice command having a password or account information (usually a numeric sequence) for communication from the driver to a voice automated menu-driven system such as voice mail systems and automated account systems during a call. A voice recognition module of the vehicle appliance converts the voice command such as a numeric account number from the driver into appropriate key tones (such as, for example DTMF tones). (Each number button of a cell phone has a tone of a specific frequency corresponding thereto.) The Bluetooth™ communications module then wirelessly sends these key tones to the cell phone. The cell phone then "dials" the DTMF tones for receipt by the voice automated menu-driven system during the call.

A problem with this configuration is that oftentimes passwords and account numbers are long, confusing numeric sequences that the driver simply cannot memorize. The driver typically has many account numbers for credit cards, bank accounts, etc. which compounds this problem. As such, the ability of transferring account numbers for receipt by an automated menu-driven system during a call using voice commands is not an advantage as the account numbers are not readily known by the driver. That is, the driver will likely have to access a paper statement or the like to obtain an account number during the call which defeats the purpose of being able to transfer the account number using voice commands. It would be desirable if the driver could simply say a name associated with an account number such as "Visa"™ when the driver wants to transfer his Visa™ account number for receipt by a voice-automated menu-driven system during a call.

SUMMARY OF THE INVENTION

Accordingly, it is an object of the present invention to provide a method of operating a hands-free, Bluetooth™ enabled telephone system for a vehicle in which the method enables an operator such as the driver of the vehicle to say multiple voice commands at one time to control the operation of the telephone system.

It is another object of the present invention to provide a method of operating a hands-free, Bluetooth™ enabled telephone system for a vehicle in which the method enables the pairing between Bluetooth™ enabled cell phones and a Bluetooth™ communications module of the telephone system to be conducted in a human friendly manner.

In carrying out the above objects and other objects, the present invention provides a method of pairing Bluetooth™ enabled devices including a portable phone with a Bluetooth™ communications module of a vehicular, hands-free telephone system. The method includes using vocal communications to prompt an operator of the portable phone to enter a given PIN number into the portable phone. The presence of any Bluetooth™ enabled devices within the vicinity of the Bluetooth™ communications module is then searched. Vocal communications are then used to prompt the operator to vocally state a name for the portable phone, and to prompt the operator to vocally state a pairing priority to be assigned to the portable phone. If the assigned pairing priority is not assigned to another Bluetooth™ enabled device, then the name and the pairing priority are associated with the portable phone. Communications between the Bluetooth™ communications module and the portable phone are then enabled if the portable phone has the highest pairing priority amongst all of the Bluetooth™ enabled devices present within the vicinity of the Bluetooth™ communications module.

Further, in carrying out the above objects and other objects, the present invention provides a hands-free telephone system for a vehicle. The system includes a vehicle appliance having a voice recognition module, a voice synthesizer, a communications module, and a controller. The voice recognition module is operable for receiving vocal communications from an operator of the vehicle. The voice synthesizer is operable for outputting vocal communications for the operator to hear. The communications module is operable to wirelessly communicate with a portable phone within the vicinity of the communications module upon the phone being paired with the communications module. The vehicle appliance is configured to enter a pair state for pairing the phone with the communications module. Upon the vehicle appliance entering the pair state the voice synthesizer outputs vocal communications to prompt the operator to enter a given PIN number into the phone, the communications module wirelessly searches for the presence of the phone within the vicinity of the communications module, the voice synthesizer outputs vocal communications to prompt the operator to vocally state a name for the phone and a pairing priority to be assigned to the phone, and, upon the voice recognition module receiving vocal communications from the operator indicative of the name and the pairing priority, the controller associates the name and the pairing priority with the phone and pairs the phone with the communications module if the pairing priority is not assigned to another portable device. The controller enables the communications module to wirelessly communicate with the phone if the phone has the highest pairing priority amongst all devices within the vicinity of the communications module which are paired with the communications module. In an embodiment, the phone is a Bluetooth™ enabled portable phone and the communications module is a Bluetooth™ enabled communications module.

Also, in carrying out the above objects and other objects, the present invention provides a method of pairing a portable phone with a vehicle appliance having a voice recognition module, a voice synthesizer, a communications module, and a controller. The method includes outputting, by the voice synthesizer, vocal communications indicative of a given PIN number to an operator of the phone and vocal communications prompting the operator to enter the given PIN number into the phone. The method includes wirelessly searching, by the communications module, for the presence of the phone within the vicinity of the communications module. The method includes outputting, by the voice synthesizer, vocal communications prompting the operator to vocally state a name for the phone and a pairing priority to be assigned to the phone. The method includes receiving, by the voice recognition module, vocal communications from the operator indicative of the name and the pairing priority. The method includes associating, by the controller, the name and the pairing priority with the phone. The method includes pairing, by the controller, the phone with the communications module if the pairing priority is not assigned to another portable device. The method includes enabling, by the controller, the communications module to wirelessly communicate with the phone if the phone has the highest pairing priority amongst all devices within the vicinity of the communications module which are paired with the communications module. In an embodiment, the phone is a Bluetooth™ enabled portable phone and the communications module is a Bluetooth™ enabled communications module.

DETAILED DESCRIPTION OF THE PREFERRED EMBODIMENT(S)

Figure 1:
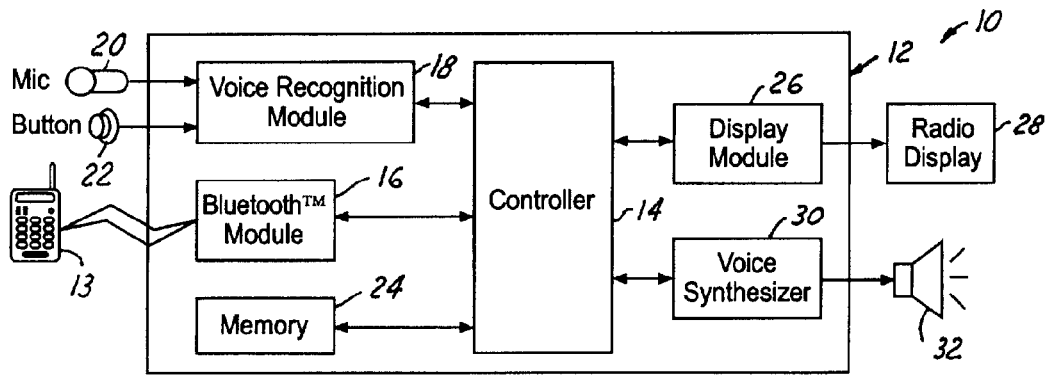
FIG. 1 illustrates a block diagram of a hands-free, Bluetooth™ enabled telephone system for a vehicle in accordance with the present invention.

Referring now to FIG. 1, a block diagram of a hands-free, Bluetooth™ enabled telephone system 10 for a vehicle in accordance with the present invention is shown. Telephone system 10 includes a vehicle appliance 12 which is integrated as part of the vehicle. Vehicle appliance 12 generally enables an operator of the vehicle such as a driver to use a Bluetooth™ enabled cell phone 13 located somewhere in the vehicle in a hands-free manner. That is, vehicle appliance 12 generally enables the driver to control the operation of cell phone 13 using voice commands. Through the use of Bluetooth™ communications technology, vehicle appliance 12 and cell phone 13 wirelessly transmit signals between themselves to communicate with one another.

Vehicle appliance 12 generally includes a microprocessor such as a controller 14 which controls the overall operation of the vehicle appliance. Vehicle appliance 12 further includes a Bluetooth™ communications module 16 which wirelessly communicates with cell phone 13. Bluetooth™ communications technology is well understood by persons of ordinary skill in the prior art.

Vehicle appliance 12 also includes a voice recognition module 18. Voice recognition module 18 is connected to a microphone 20 for receiving verbal communications including voice commands from the driver. Voice recognition module 18 is operable to transfer verbal communications from the driver via microphone 20 to controller 14. Voice recognition module 18 is also operable to translate voice commands from the driver into corresponding electrical signals for use by controller 14. For example, voice recognition module is operable to translate the voice command "dial" into a corresponding electrical command signal for use by controller 14. Similarly, voice recognition module 18 is operable to translate numeric characters said by the driver into corresponding electrical information signals for use by controller 14. Voice recognition module 18 is also connected to an input button 22 for receiving manual commands from the driver. For example, the driver presses input button 22 when the driver desires to have vehicle appliance 12 go into certain modes such as phone call barge-in (described below).

Vehicle appliance 12 further includes a memory module 24. Memory module 24 stores information which may also be stored in the memory of cell phone 13 such as a listing of names and associated telephone numbers. Vehicle appliance 12 also includes a display module 26 which is connected to a display of the vehicle such as an LCD display 28 of the vehicle's radio via the vehicle electrical bus architecture.

Vehicle appliance 12 also includes a voice synthesizer module 30 which is operable to generate electronic voice signals in response to corresponding electrical signals provided by controller 14 during operation. Voice synthesizer module 30 is connected to a speaker 32 mounted in the vehicle such as the vehicle's radio speakers via the electrical bus architecture. Voice synthesizer module 30 outputs the electronic voice signals to the radio speaker 32 for the driver to hear. For example, such outputted electronic voice signals may be the information "Dialing John" when cell phone 13 is dialing John's telephone number.

An example of the general process employed by telephone system 10 when the driver wants to make a call will now be described in order to provide a general description of the operation of the telephone system. In order to initiate a call, the driver presses input button 22 to advise telephone system 10 that the driver wants to make a call. In response, telephone system 10 mutes the radio to free the radio speaker 32 for use by the telephone system. The driver then says multiple voice commands such as "Dial John" into microphone 20.

Voice recognition module 18 processes these voice commands to determine that the driver wants to make a call to John. Voice recognition module 18 provides this information to controller 14. Controller 14 accesses memory module 24 to find a stored telephone number for "John." (Controller 14 may also be configured to find a stored telephone number for "John" in the memory of cell phone 13 using Bluetooth™ communications module 16.) Upon locating the stored telephone number for John, controller 14 instructs Bluetooth™ communications module 16 to wirelessly transmit the digits of John's telephone number to cell phone 13 for the cell phone to dial. Cell phone 13 then dials John's telephone number to make the call to John.

Assuming that John answers his telephone, a call is connected between cell phone 13 and John's telephone using typical cell phone communications. John then says "Hello" into his telephone which is received by cell phone 13. Cell phone 13 wirelessly transfers John's "hello" to Bluetooth™ communications module 16. Controller 14 then outputs John voice with the word "hello" to radio speaker 32 for the driver to hear. The driver then says "hello John" into microphone 20.

Bluetooth™ communications module 16 wirelessly transmits the driver's "hello John" to cell phone 13 for transmission from the cell phone to John's telephone using typical cell phone communications.

This process is repeated to enable the conversation between the driver and John. In this way, the driver is able to communicate with John in a hands-free manner through the use of cell phone 13. As the speaker and microphone of cell phone 13 are not required to make a call when using telephone system 10, the cell phone may be in a briefcase, vehicle trunk, etc.

Figure 2:
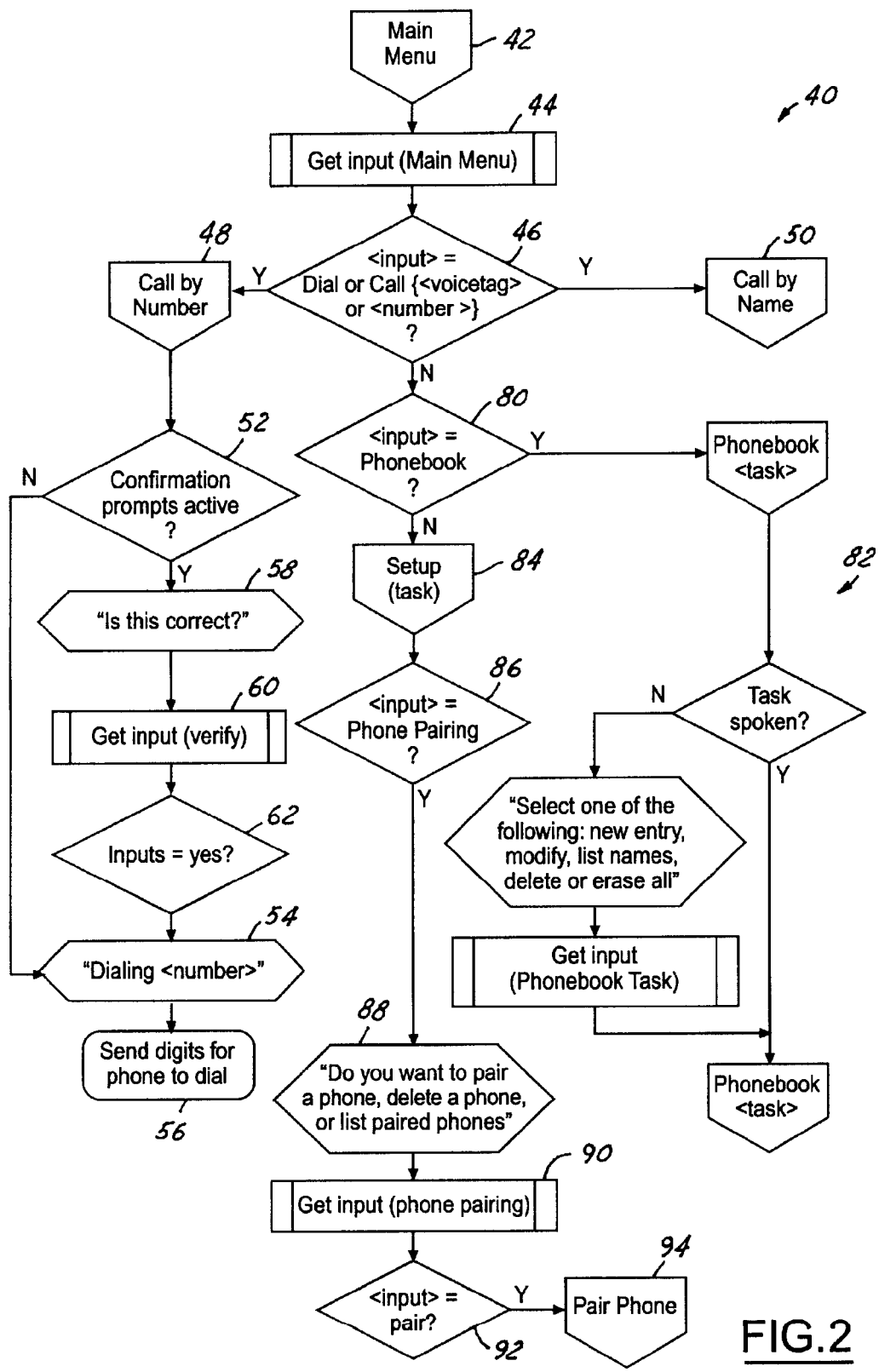
FIG. 2 illustrates a flowchart describing the general operation of the telephone system including the call by number state operation of the telephone system.

Referring now to FIG. 2, with continual reference to FIG. 1, a flowchart 40 describing the general operation of telephone system 10 including the operation of calling by number is shown. Initially, the driver presses input button 22 to instruct telephone system 10 to be in a main menu state 42. The driver then says multiple voice commands in microphone 22 for receipt by voice recognition module 18 as shown by block 44. As shown in diamond 46, controller 14 determines whether the multiple voice commands spoken by the driver is "Dial <voicetag> or <number>" (or "Call <voicetage> or <number>" where <voicetag> is a name such as "John" and <number> is a telephone number. (As used herein, "Dial" and "Call" are equivalent voice commands in which the driver may use either voice command to instruct telephone system 10 that the driver wishes to make a call.) If the multiple voice commands are "Dial 888 555-1212", then telephone system 10 enters a call by number state 48. Likewise, if the multiple voice commands are "Dial John", then telephone system 10 enters a call by name state 50.

In the case of call by number state 48, if a number confirmation prompt shown by diamond 52 is not active, then voice synthesizer 30 outputs to radio speaker 32 the electronic voice signal "Dialing 888 555-1212" for the driver to hear as shown in tetrahedron 54. Controller 14 then instructs Bluetooth™ communications module 16 to wirelessly transmit the number "888 555-1212" to cell phone 13 for the cell phone to dial as shown by oval 56. If the number confirmation prompt is active, then voice synthesizer 30 outputs to radio speaker 32 something to the effect of "Is 888 555-1212" correct for the driver to hear as shown in tetrahedron 58. Telephone system 10 then waits for vocal confirmation from the driver as shown in block 60. If the driver says "yes" into microphone 20 as shown by diamond 62, then voice synthesizer 30 outputs "Dialing 888 555-1212" for the driver to hear as shown in tetrahedron 54 and controller 14 causes cell phone 13 to dial the number "888 555-1212" as shown by oval 56 in order to make the call.

Figure 3:
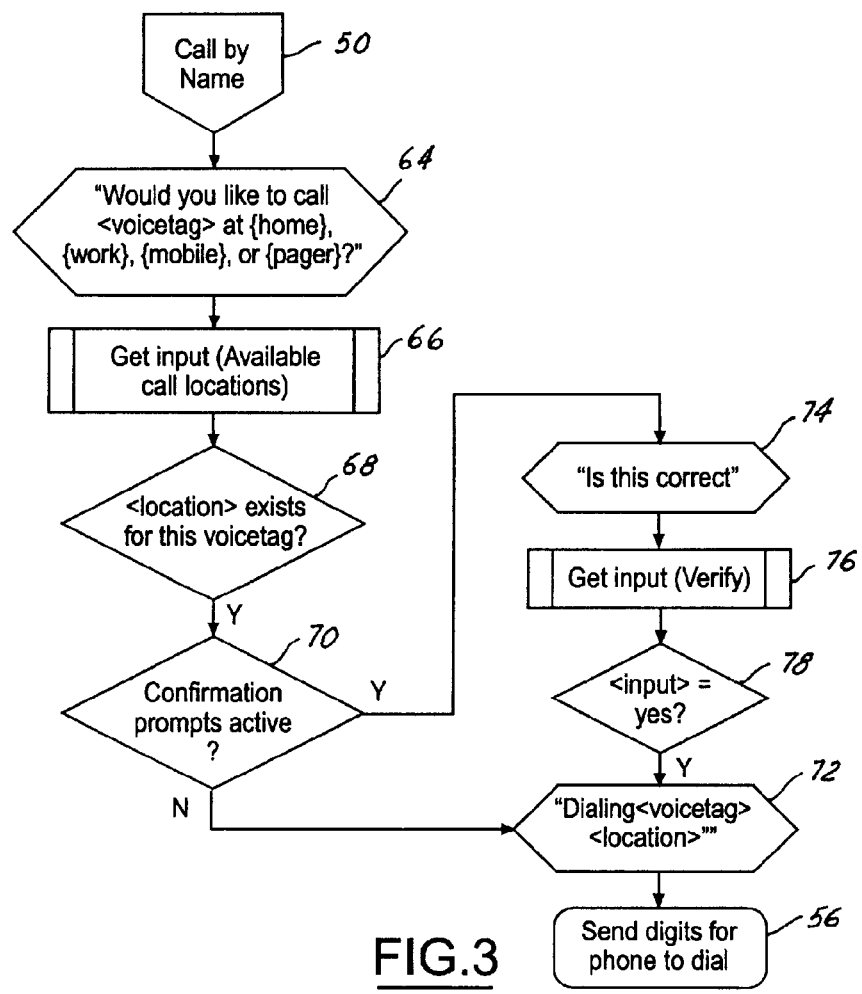
FIG. 3 illustrates a flowchart describing the call by name state operation of the telephone system.

Referring now to FIG. 3, with continual reference to FIGS. 1 and 2, the case of call by name state 50 will be described. In this case, voice synthesizer 30 outputs to radio speaker 32 for the driver to hear something to the effect of "Would you like to call John at home or work" as shown by tetrahedron 64. Telephone system 10 then waits for the driver to say a location such as "home" or "work" into microphone 20 as shown by block 66. Assuming that the driver says "home", controller 14 then accesses memory module 24 (and/or the memory of cell phone 13) to locate the telephone number for John's home as shown in diamond 68. For example, John's home telephone number may be "888 555-1212." If a location confirmation prompt shown by diamond 70 is not active, then voice synthesizer 30 outputs "Dialing John at home" as shown by tetrahedron 72 for the driver to hear. Controller 14 then instructs Bluetooth™ communications module 16 to wirelessly transmit John's home telephone number (which is 888 555-1212) to cell phone 13 for the cell phone to dial as shown by oval 56 in order to make the call.

It is noted that steps 64 and 66 could be eliminated in the case of the driver initially saying the three voice commands "Dial John at home" at block 44. In this case, controller 14 would access memory to locate the telephone number for John's home without requesting any further input from the driver. As such, steps 68, 70, 72, and 56 would immediately follow call by name state 50.

If the location confirmation prompt is active, then voice synthesizer 30 outputs to radio speaker 32 something to the effect of "Is John's home correct" for the driver to hear as shown in tetrahedron 74. Telephone system 10 then waits for vocal confirmation from the driver as shown in block 76. If the driver says "yes" into microphone 20 as shown by diamond 78, then voice synthesizer 30 outputs "Dialing John at home" for the driver to hear as shown in tetrahedron 72 and controller 14 causes cell phone 13 to dial John's home telephone number (which is 888 555-1212) as shown by oval 56 in order to make the call.

Referring back to FIG. 2, with continual reference to FIG. 1, if the multiple voice commands spoken by the driver is not "Dial <voicetag> or <number>" such that telephone system 10 does not enter into either call by number state 48 or call by name state 50, then the process flows from diamond 46 to diamond 80. In diamond 80, controller 14 determines whether the driver's vocal command is "phonebook." The "phonebook" command refers to the driver's ability to modify the information stored in memory module 24 (and/or in cell phone 13). For example, the driver is able to use voice commands to store names and associated telephone numbers in memory module 24, delete existing entries stored in the memory module, modify existing entries stored in the memory module, etc. Typically, the driver stores names such as "John" with associated telephone numbers such as "888 555-1212" in memory module. The driver may also associate locations with the stored names and numbers such as "home", "work", "pager", etc. in memory module 24. Additionally, memory module 24 is configured to store account names such as "Visa"™ credit card and associated account numbers such as "1234 5678 1111 9999." The process steps generally labeled with reference number 82 are directed to the processes in which the driver modifies memory module 24 as desired.

If the driver did not say "phonebook" in diamond 80, then controller 14 causes telephone system to enter a setup task state 84. Controller 14 then determines whether the driver's vocal command is "phone pairing" as shown by diamond 86. If so, then voice synthesizer 30 outputs something to the effect of "Do you want to pair a phone, delete a paired phone, or list paired phones" as shown by tetrahedron 88. Telephone system 10 then waits for the driver to say the desired pairing option as shown in block 90. If the driver says the voice command "pair" into microphone 20 as shown by diamond 92, then telephone system 10 enters a pair phone state 94.

Figure 4:
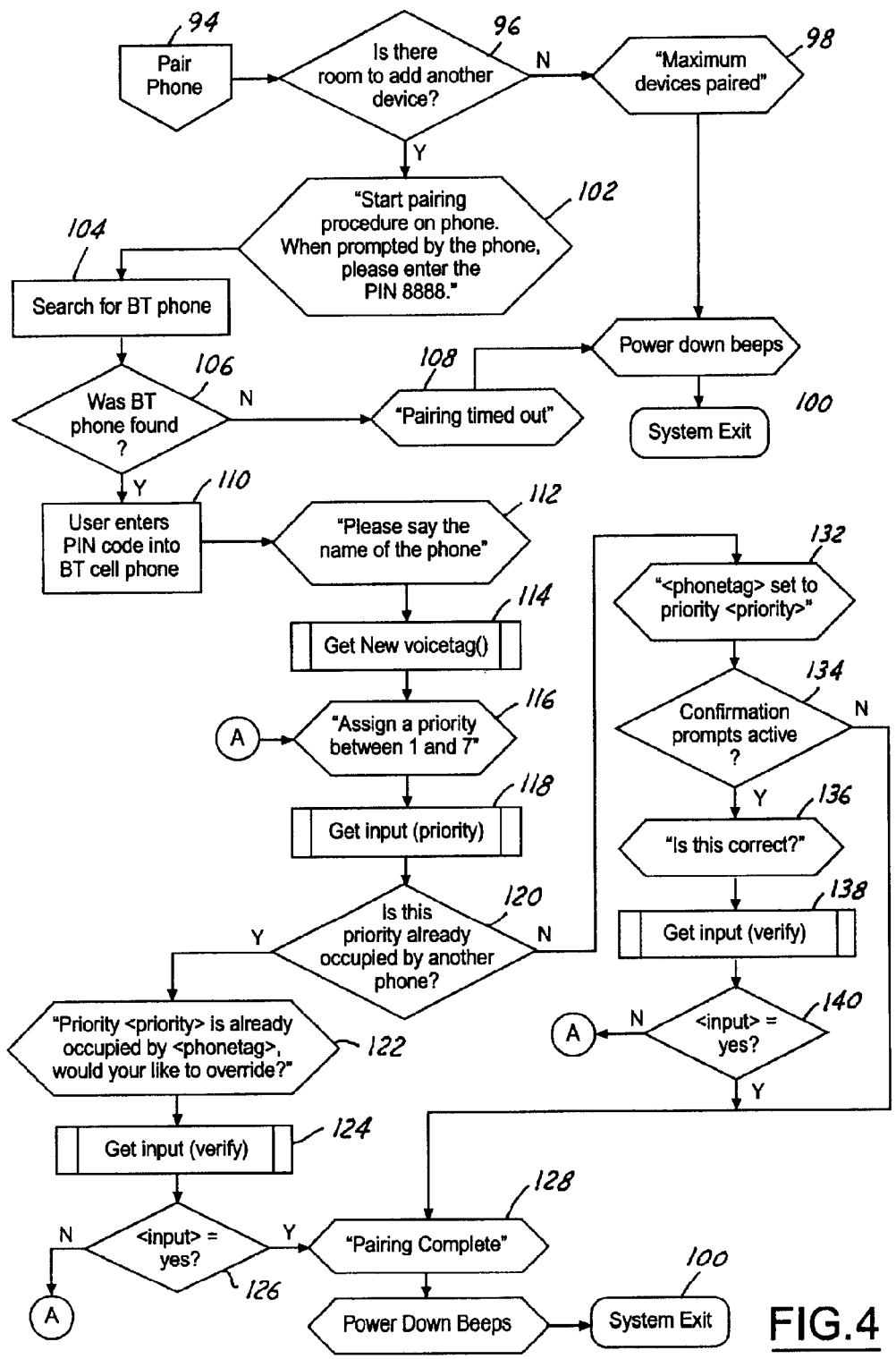
FIG. 4 illustrates a flowchart describing the pairing operation between Bluetooth™ enabled cell phones and other devices with the Bluetooth™ communications module of the telephone system.

Referring now to FIG. 4, with continual reference to FIGS. 1 and 2, the pair phone state 94 of telephone system 10 will now be described. Upon telephone system 10 entering pair phone state 94, controller 14 determines whether there is room to pair cell phone 13 with Bluetooth™ communications module 16 as shown by diamond 96. It is noted that Bluetooth™ communications module 16 can only be paired with so many Bluetooth™ enabled communications devices such as Bluetooth™ enabled cell phone 13. If controller 14 determines that there is no room to pair cell phone with Bluetooth™ communications module 16 as shown by tetrahedron 98, then pair phone state 94 is exited as shown by oval 100.

If controller 14 determines that there is room, then voice synthesizer 30 outputs something to the effect of "Start pairing procedure on phone. When prompted by the phone, please enter the PIN 8888" as shown by tetrahedron 102. It is noted that the PIN 8888 is a generic number that is verbally given by telephone system 10 to the driver during the pairing process. Controller 14 then instructs Bluetooth™ communications module 16 to wirelessly search for Bluetooth™ enabled cell phone 13 as shown by block 104. Controller 14 then determines whether communications module 16 located cell phone 13 as shown by diamond 106 within a predetermined time period. If cell phone 13 was not located within the time period, then voice synthesizer outputs something to the effect of "Paring time out" as shown by tetrahedron 108 and the pair phone state 94 is exited as shown by oval 100.

If cell phone 13 was located during the time period, the driver then enters the PIN 8888 into cell phone 13 as shown by block 110. Voice synthesizer 30 then outputs something to the effect of "Please say the name of the phone" for the driver to hear as shown by tetrahedron 112. The driver then says the name of cell phone 13 such as "personal cell phone" into microphone 20. Controller 14 associates the name "personal cell phone" with cell phone 13 for storage in memory module 24 as shown by block 114. Voice synthesizer 30 then outputs something to the effect of "Assign a priority between 1 and 7" for the driver to hear as shown by tetrahedron 116. It is noted that only one Bluetooth™ enabled device such as cell phone 13 functions at one time with Bluetooth™ communications module 16. This is to prevent confusion in the case of multiple Bluetooth™ enabled devices being present in the vehicle at any given time. If there is more than one Bluetooth™ enabled device present in the vehicle, then Bluetooth™ communications module 16 is to function with the Bluetooth™ enabled device having the highest priority.

In response to the inquiry in tetrahedron 116, the driver vocally states a priority between 1 and 7 in microphone 20 for receipt by controller 14 as shown in block 118. The priority is to be associated with cell phone 13. The highest priority may be "1" and the lowest priority may be "7." Controller 14 then determines whether the priority number stated by the driver is already occupied by another Bluetooth™ enabled device as shown by diamond 120. If the priority number is already being used, then voice synthesizer 30 outputs something to the effect of "This priority number is already occupied, would you like to override" for the driver to hear as shown by tetrahedron 122. The driver then vocally states either "yes" or "no" in microphone 20 for receipt by controller 14 as shown by block 124. If the driver's command is "no" as shown in diamond 126, then process steps 116, 118, 120, 122, and 124 are repeated. If the answer is "yes" as shown in diamond 126, then voice synthesizer 30 outputs something to the effect of "Pairing complete" for the driver to hear as shown by tetrahedron 128. At this time, controller 14 pairs cell phone 13 with Bluetooth™ communications module 16 with the given priority number and the pair phone state 94 is exited as shown by oval 100.

If controller 14 determines that the priority number vocally stated by the driver such as "one" is available as shown by diamond 120, then voice synthesizer 30 outputs something to the effect of "personal cell phone set to priority one" for the driver to hear as shown by tetrahedron 132. If priority confirmation prompts are inactive as shown by diamond 134, then voice synthesizer 30 outputs something to the effect of "Pairing complete" for the driver to hear as shown by tetrahedron 128, controller 14 pairs cell phone 13 and communications module 16 with the given priority number, the pair phone state 94 is exited as shown by oval 130.

If priority confirmation prompts are active as shown in diamond 134, then voice synthesizer 30 outputs something to the effect of "Is the priority one correct" for the driver to hear as shown by tetrahedron 136. The driver then vocally states either "yes" or "no" into microphone 20 for receipt by controller 14 as shown by block 138. If controller 14 determines the driver's answer to be "yes" as shown in diamond 140 then the controller pairs cell phone 13 and communications module 16 with the priority number "one" and the pair phone state 94 is exited as shown by oval 130.

Figure 5:
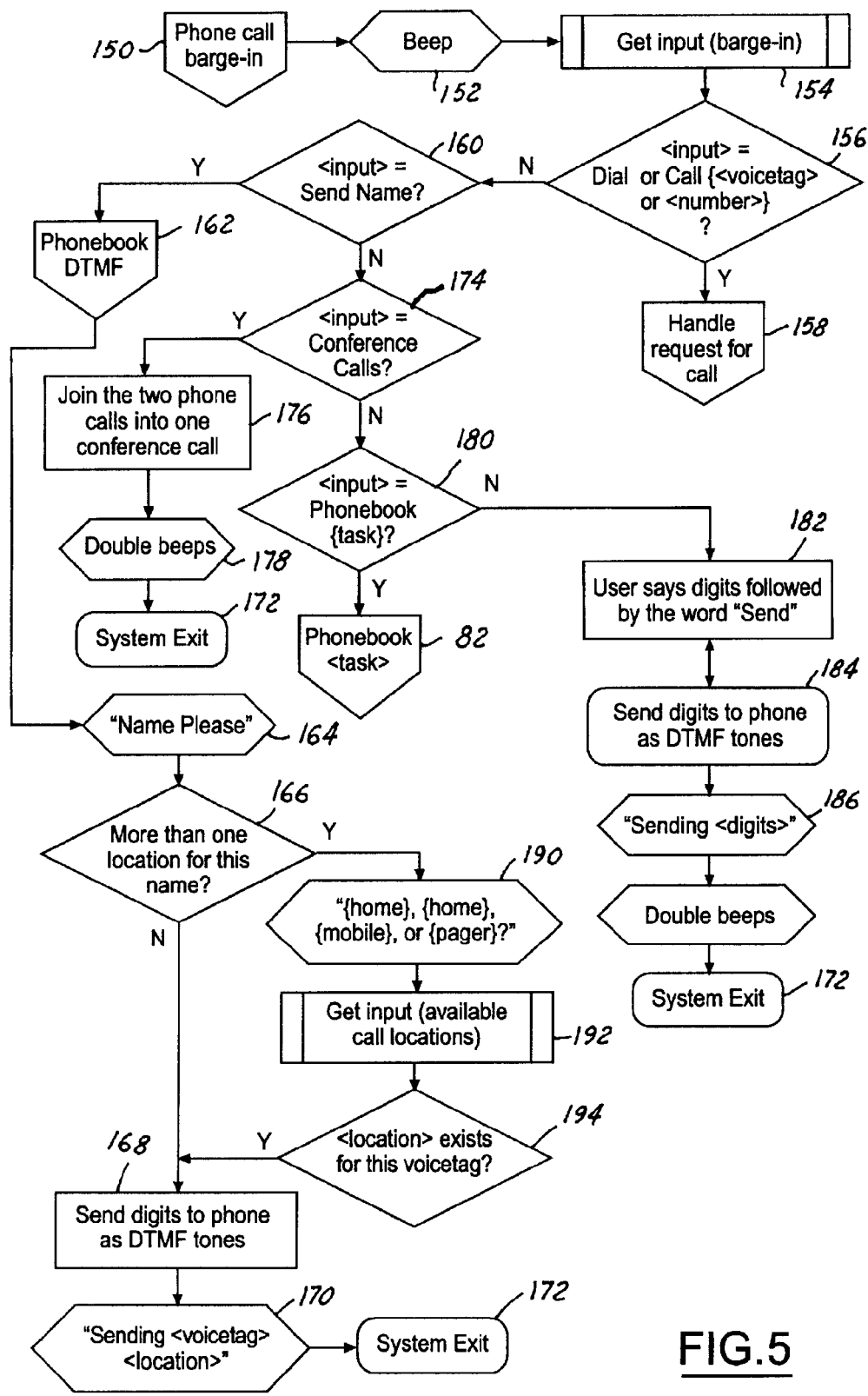
FIG. 5 illustrates a flowchart describing the phone call barge-in state operation of the telephone system.

Referring now to FIG. 5, with continual reference to FIGS. 1 and 2, the phone call barge-in state 150 of telephone system 10 will be described. In general, phone call barge-in state 150 occurs when a call between cell phone 13 and another telephone (such as John's telephone or a voice automated menu-driven system) is already in progress.

In accordance with the present invention, telephone system 10 is operable to enable the driver to vocally state a voice tag such as a credit card name or the like during a call with a voice automated menu-driven system in which the telephone system then provides the associated stored credit card number from memory to the menu-driven system. This process begins with the driver pressing button 22 to advise telephone system 10 to enter the phone call barge-in state 150 during a call. Voice synthesizer 30 then generates a beeping sound for the driver to hear as shown by tetrahedron 152. The driver then says a vocal command for receipt by controller 14 as shown by block 154. Controller 14 determines if the vocal command is a command to dial another number as shown by diamond 156. If the vocal command is to dial another number (or name) then telephone system 10 either enters call by number state 48 or call by name state 50 as shown by the handle request for call state 158.

If the vocal command is not to dial another number (or name) then controller determines if the vocal command is "send name" as shown by diamond 160. If the vocal command is "send name" then telephone system 10 enters the phonebook DTMF state 162. The phonebook DTMF state 162 enables the driver to say an account name such as "Visa"™ during a call with a voice automated menu-driven system to have telephone system 10 transmit the account number associated with the account name to the menu-driven system. As such, the driver need simply say "Visa"™ during the call to transfer the associated account number without actually having to vocally state the digits of the associated account number (or say "John" to transfer John's telephone number). To this end, voice synthesizer 30 outputs something to the effect of "name please" for the driver to hear as shown by tetrahedron 164.

The driver then vocally states the desired name such as "my Visa™ card" into microphone 20 for receipt by controller 14. Controller 14 then accesses memory module 24 (and/or the memory of cell phone 13) to see if any entries are is stored for "my Visa™ card" as shown in diamond 166. If there is only one entry for "my Visa™ card" then controller 14 obtains the stored account number for the Visa™ card from the memory. Controller 14 then translates the digits of the account number into a series of DTMF tones and communications module 16 wirelessly transmits the DTMF tones to cell phone 13 as shown by block 168. Cell phone 13 then "dials" these DTMF tones for receipt by the menu-driven system during the call. While cell phone 13 is dialing the DTMF tones, voice synthesizer 30 may output something to the effect of "sending Visa™ account number" for the driver to hear as shown by tetrahedron 170. The phone call barge-in state 150 is then exited as shown by oval 172.

Controller 14 may determine that there is more than one stored account number for the entry "my Visa™ card." For instance, there may be personal and business Visa™ credit card account numbers associated with the entry "my Visa™ card." In this case, voice synthesizer 30 outputs something to the effect of "personal or business account number" for the driver to hear as shown by tetrahedron 190. The driver then vocally states either "personal" or "business" into microphone 20 for receipt by controller 14 as shown by block 192. If controller 14 determines that an account number associated with the driver's choice is stored in memory as shown by diamond 194, then steps 168, 170, and 172 follow.

If the vocal command is not "send name" in diamond 160, then controller 14 determines if the vocal command is "conference call" as shown by diamond 174. If the vocal command is "conference call" and a second call in addition to the original call are in progress, then controller 14 causes the two calls to be joined into one conference call as shown by block 176. Voice synthesizer 30 outputs a series of beeps for the driver to hear as shown by tetrahedron 178 to confirm that the calls have been joined into a conference call and the phone call barge-in state 150 is exited as shown by oval 172. As such, the driver need simply say "conference call" while two calls are in progress in order to join the two calls into one conference call.

If the vocal command is not "conference call" as shown by diamond 174, then controller 14 determines if the vocal command is "phonebook" as shown by diamond 180. If so, then telephone system 10 performs the phonebook steps 82 (shown in FIG. 1). If the vocal command is a series of digits such as the digits of the Visa™ credit card followed by the word "send" as shown in block 182, then controller 14 translates the digits into corresponding DTMF tones. Communications module 16 then wirelessly transfers the DTMF tones to cell phone 13 as shown in oval 184. Voice synthesizer 30 confirms this action by outputting something to the effect of "sending <digits>" for the driver to hear as shown by tetrahedron 186 and the phone call barge-in state 150 is exited as shown by oval 172.

Thus, it is apparent that there has been provided, in accordance with the present invention, a method of operating a hands-free, Bluetooth™ enabled telephone system for a vehicle that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A hands-free telephone system for a vehicle, the system comprising:

a vehicle appliance having a voice recognition module, a voice synthesizer, a communications module, and a controller;

the voice recognition module being operable for receiving vocal communications from an operator of the vehicle;

the voice synthesizer being operable for outputting vocal communications for the operator to hear;

the communications module being operable to wirelessly communicate with a portable phone within the vicinity of the communications module upon the phone being paired with the communications module;

wherein the vehicle appliance is configured to enter a pair state for pairing the phone with the communications module, wherein upon the vehicle appliance entering the pair state the voice synthesizer outputs vocal communications indicative of a given PIN number to the operator and outputs vocal communications to prompt the operator to enter the given PIN number into the phone, the communications module wirelessly searches for the presence of the phone within the vicinity of the communications module, upon the given PIN number being entered into the phone subsequent to the presence of the phone within the vicinity of the communications module being detected by the communications module, the voice synthesizer outputs vocal communications to prompt the operator to vocally state a name for the phone and a pairing priority to be assigned to the phone, and, upon the voice recognition module receiving vocal communications from the operator indicative of the name and the pairing priority, the controller associates the name and the pairing priority with the phone and pairs the phone with the communications module if the pairing priority is not assigned to another portable device.

2. The system of claim 1 wherein:
if the assigned pairing priority is assigned to another device, then the voice synthesizer outputs vocal communications to prompt the operator to vocally state another pairing priority to be assigned to the phone.

3. A method of pairing a portable phone with a vehicle appliance having a voice recognition module, a voice synthesizer, a communications module, and a controller, the method comprising:
   outputting, by the voice synthesizer, vocal communications indicative of a given PIN number to an operator of the phone;
   outputting, by the voice synthesizer, vocal communications prompting the operator to enter the given PIN number into the phone;
   wirelessly searching, by the communications module, for the presence of the phone within the vicinity of the communications module;
   upon the given PIN number being entered into the phone subsequent to the presence of the phone within the vicinity of the communications module being detected by the communications module, outputting, by the voice synthesizer, vocal communications prompting the operator to vocally state a name for the phone and a pairing priority to be assigned to the phone;
   receiving, by the voice recognition module, vocal communications from the operator indicative of the name and the pairing priority; and
   associating, by the controller, the name and the pairing priority with the phone;
   pairing, by the controller, the phone with the communications module if the pairing priority is not assigned to another portable device.

4. The method of claim 3 further comprising:
outputting, by the voice synthesizer, vocal communications prompting the operator to vocally state another pairing priority if the pairing priority initially stated by the operator is assigned to another device.

5. The system of claim 1 wherein:
the controller enables the communications module to wirelessly communicate with the phone if the phone has the highest pairing priority amongst all devices within the vicinity of the communications module which are paired with the communications module.

6. The method of claim 3 further comprising:
enabling, by the controller, the communications module to wirelessly communicate with the phone if the phone has the highest pairing priority amongst all devices within the vicinity of the communications module which are paired with the communications module.

* * * * *